(12) United States Patent
Oswal et al.

(10) Patent No.: US 11,785,048 B2
(45) Date of Patent: Oct. 10, 2023

(54) CONSISTENT MONITORING AND ANALYTICS FOR SECURITY INSIGHTS FOR NETWORK AND SECURITY FUNCTIONS FOR A SECURITY SERVICE

(71) Applicant: Palo Alto Networks, Inc., Santa Clara, CA (US)

(72) Inventors: Anand Oswal, Pleasanton, CA (US); Arivu Mani Ramasamy, San Jose, CA (US); Kumar Ramachandran, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 305 days.

(21) Appl. No.: 17/086,191

(22) Filed: Oct. 30, 2020

(65) Prior Publication Data
US 2022/0141254 A1    May 5, 2022

(51) Int. Cl.
*H04L 9/40*    (2022.01)
(52) U.S. Cl.
CPC ............ *H04L 63/20* (2013.01); *H04L 63/029* (2013.01); *H04L 63/101* (2013.01); *H04L 63/1408* (2013.01)
(58) Field of Classification Search
CPC ..... H04L 63/20; H04L 63/029; H04L 63/101; H04L 63/1408; H04L 63/0263
See application file for complete search history.

(56) References Cited

U.S. PATENT DOCUMENTS

| | | | | |
|---|---|---|---|---|
| 10,116,624 | B2 * | 10/2018 | Mower | H04L 63/0236 |
| 10,397,116 | B1 * | 8/2019 | Volpe | H04L 63/101 |
| 2002/0023089 | A1 * | 2/2002 | Woo | H04L 63/0263 |
| 2007/0104197 | A1 * | 5/2007 | King | H04L 63/1483 370/392 |
| 2009/0241170 | A1 * | 9/2009 | Kumar | H04L 47/2458 370/235 |

(Continued)

FOREIGN PATENT DOCUMENTS

| CN | 103907330 | 6/2017 |
|---|---|---|
| CN | 111614605 | 8/2022 |

(Continued)

OTHER PUBLICATIONS

Jchibayashi et al., iKaaS, Privacy Preserved IoT Platform, Sep. 29, 2017.

(Continued)

*Primary Examiner* — John B King
(74) *Attorney, Agent, or Firm* — Van Pelt, Yi & James LLP

(57) ABSTRACT

Techniques for providing consistent monitoring and analytics for security insights for network and security functions for a security service are disclosed. In some embodiments, a system/process/computer program product for providing consistent monitoring and analytics for security insights for network and security functions for a security service includes receiving a flow at a software-defined wide area network (SD-WAN) device; inspecting the flow to determine whether the flow is associated with a split tunnel; and monitoring the flow at the SD-WAN device to collect security information associated with the flow for reporting to a security service.

21 Claims, 9 Drawing Sheets

(56) References Cited

U.S. PATENT DOCUMENTS

| | | | |
|---|---|---|---|
| 2013/0111040 A1* | 5/2013 | Vempati | H04L 63/029 709/227 |
| 2013/0298201 A1* | 11/2013 | Aravindakshan | H04L 69/164 726/4 |
| 2013/0322255 A1* | 12/2013 | Dillon | H04L 12/2867 370/236 |
| 2014/0040503 A1* | 2/2014 | Mower | H04L 63/0236 709/238 |
| 2014/0259094 A1* | 9/2014 | Narayanaswamy | H04L 63/1425 726/1 |
| 2014/0317312 A1* | 10/2014 | Mitchell | H04L 12/4633 709/244 |
| 2015/0128267 A1 | 5/2015 | Gupta | |
| 2015/0205600 A1* | 7/2015 | Grillo | G06F 16/148 717/101 |
| 2016/0050182 A1 | 2/2016 | Naasief | |
| 2016/0080502 A1 | 3/2016 | Yadav | |
| 2017/0093681 A1 | 3/2017 | Chaubey | |
| 2017/0155590 A1* | 6/2017 | Dillon | H04L 43/0852 |
| 2018/0041472 A1* | 2/2018 | Mower | H04L 63/0227 |
| 2019/0036814 A1 | 1/2019 | Aranha | |
| 2019/0104111 A1 | 4/2019 | Cidon | |
| 2019/0158371 A1* | 5/2019 | Dillon | H04L 47/196 |
| 2019/0182155 A1* | 6/2019 | Chang | H04L 45/50 |
| 2019/0372937 A1* | 12/2019 | Song | H04L 63/0227 |
| 2020/0145405 A1 | 5/2020 | Bosch | |
| 2020/0159947 A1* | 5/2020 | Shenefiel | H04L 63/1425 |
| 2020/0195557 A1 | 6/2020 | Duan | |
| 2020/0213212 A1* | 7/2020 | Dillon | H04L 43/16 |
| 2020/0304459 A1* | 9/2020 | Konda, Jr. | H04L 63/126 |
| 2020/0322230 A1 | 10/2020 | Natal | |
| 2020/0366530 A1 | 11/2020 | Mukundan | |
| 2021/0021564 A1* | 1/2021 | Chand | H04L 63/166 |
| 2021/0083983 A1* | 3/2021 | Chin | H04L 47/2441 |
| 2021/0273913 A1* | 9/2021 | Bosch | H04L 12/4641 |
| 2021/0344651 A1* | 11/2021 | Joshi | H04L 12/4633 |
| 2022/0103597 A1* | 3/2022 | Gobena | H04L 63/205 |
| 2022/0116381 A1* | 4/2022 | Bosch | H04L 63/18 |

FOREIGN PATENT DOCUMENTS

| | | | | |
|---|---|---|---|---|
| EP | 3414932 | | 9/2020 | |
| WO | WO-2007055915 A2 | * | 5/2007 | ......... H04L 63/0263 |
| WO | WO-2020139675 A1 | * | 7/2020 | ......... H04L 12/4641 |

OTHER PUBLICATIONS

Gordeychik et al., SD-WAN Threat Landscape, Nov. 12, 2018.

Michael Wood, Top Requirements on the SD-WAN Security Checklist, Network Security, Jul. 2017, pp. 9-11.

Raghavan Kasturi Rangan, Trends in SD-WAN and Sdn, Csit (Mar. 2020) 8(1):21-27, Special Issue on SDN, Published online Apr. 22, 2020.

* cited by examiner

US 11,785,048 B2

CONSISTENT MONITORING AND ANALYTICS FOR SECURITY INSIGHTS FOR NETWORK AND SECURITY FUNCTIONS FOR A SECURITY SERVICE

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
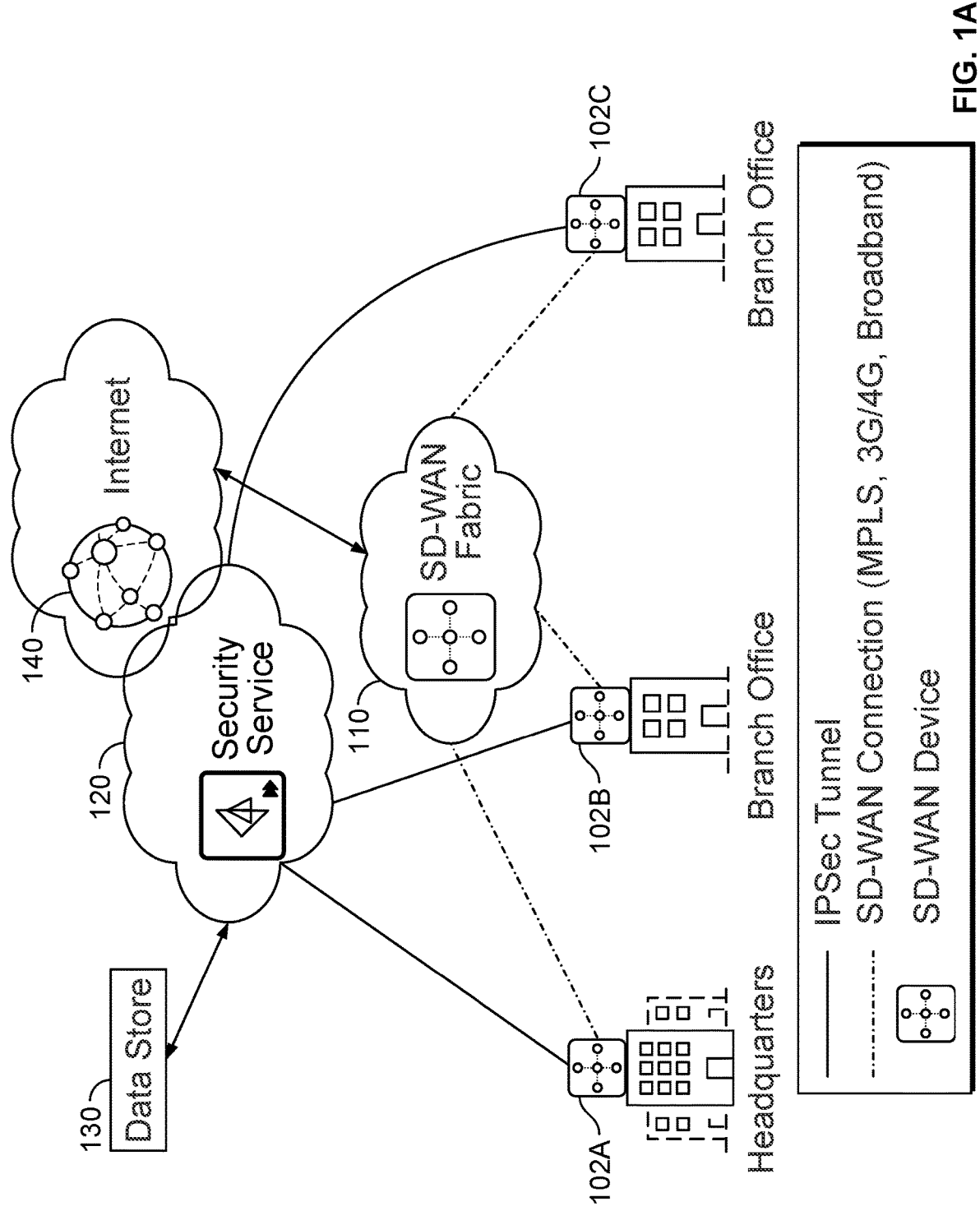
FIGS. 1A-1B are system environment diagrams including example SD-WAN architectures and a security service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Security Solutions in Evolving SD-WAN Environments

Security service providers offer various commercially available cloud-based security solutions including various firewall, VPN, and other security related services. For example, some security service providers have their own data centers in multiple geographies across the world to provide their customers such cloud-based security solutions.

Generally, cloud-based security services are offered by cloud-based security service providers in different locations/regions around the world. However, customers (e.g., enterprise customers of a given cloud-based security service provider) may have headquarters, branches, and/or other offices in various locations/regions that are in network communications with each other and the cloud-based security service and Internet using various SD-WAN connections (e.g., over SD-WAN fabric). As a result, this often introduces another layer of security monitoring that is provided at each SD-WAN device at each office location (e.g., branches, headquarters, etc.) as well as at the cloud-based security service. As such, this network/security architecture creates an inefficient use of computing resources and/or a potential for inconsistent security monitoring and enforcement as further described below.

An example of such inefficient use of computing resources (e.g., CPU and memory/storage) is that security monitoring can include providing an accurate identification of an application (e.g., also referred to herein as App ID). Network gateway firewalls (e.g., in a cloud-based security service and/or within the enterprise network infrastructure, such as in a private cloud for providing such a cloud-based security service, and/or a combination thereof) and SD-WAN devices (e.g., customer-premises equipment (CPE) SD-WAN devices in headquarters and branch office sites) can utilize such App ID information (e.g., and/or other meta information associated with the flow as described below) for performing security monitoring/enforcement and/or network functions (e.g., security policy enforcement and/or network routing, etc.). For example, determining App ID information for a flow (e.g., a new flow) can also extend to performing Application Layer Gateway (ALG) functions.

However, an App ID determination process is typically expensive in terms of computing resources (e.g., memory and CPU resources). As a result, performing an App ID determination process at both devices/compute elements/locations can reduce the scalability of both platforms (e.g., network gateway firewalls at the security service and CPE SD-WAN devices on the enterprise network).

Similarly, performing processes for determining a User ID, Device ID, Content ID, and/or other meta data associated with a flow are also typically expensive in terms of computing resources (e.g., memory and CPU resources). For example, network traffic (e.g., distinct flows) from a branch office can pass through an SD-WAN device and then to a cloud-based security service. As a result, the expensive meta data determinations associated with each flow (e.g., App ID, User ID, Device ID, Content ID, and/or other meta data associated with a flow) would typically be performed twice, which is an inefficient use of computing resources as similarly described above.

As will also be further described below, performing processes for determining such meta data determinations associated with each flow (e.g., App ID, User ID, Device ID, Content ID, and/or other meta data associated with a flow) can, in some cases, be performed inconsistently at the SD-WAN device (e.g., CPE SD-WAN device on the enterprise network) and the network gateway firewall (e.g., at the cloud-based security service). For example, the App ID, User ID, Device ID, Content ID, and/or other meta data associated with a flow can be performed slightly differently at the SD-WAN device (e.g., CPE SD-WAN device on the enterprise network) and the network gateway firewall (e.g., at the cloud-based security service), which can result in inconsistent network routing/application layer gateway enforcement and/or security policy monitoring/enforcement, which is generally not desirable for enterprise network/security policy enforcement.

Overview of Techniques for Providing Flow Meta Data Exchanges Between Network and Security Functions for a Security Service Accordingly, various techniques for providing flow meta data exchanges between network and security functions for a security service are disclosed.

In some embodiments, a system/process/computer program product for providing flow meta data exchanges between network and security functions for a security service includes receiving a flow at a network gateway of a security service from a software-defined wide area network (SD-WAN) device; inspecting the flow to determine meta information associated with the flow; and communicating the meta information associated with the flow to the SD-WAN device.

For example, processes for determining such meta data information associated with each flow (e.g., App ID, User ID, Device ID, Content ID, and/or other meta data associated with a flow) can be performed at one of the computing devices/elements/locations (e.g., at the cloud-based security service, such as provided via Prisma Access, which is a commercially available cloud-based security service from Palo Alto Networks, Inc. headquartered in Santa Clara, Calif., or another commercially available cloud-based security service can similarly be used to implement the disclosed techniques, and the cloud-based security service can be provided using a private cloud, one or more public cloud service providers, and/or any combination thereof) using the disclosed techniques. The determined meta data information associated with each flow can then be communicated (e.g., securely and efficiently communicated, such as using various techniques including encapsulating such meta information in a packet header as further described below) to an SD-WAN device (e.g., a commercially available SD-WAN device, such as a commercially available SD-WAN device from Palo Alto Networks, Inc. headquartered in Santa Clara, Calif., which provides traffic engineering, monitoring, and troubleshooting, etc. or another commercially available SD-WAN device can similarly be used to implement the disclosed techniques). In an example implementation, such determined meta data information associated with each flow is communicated in-band on the flows (e.g., using TCP options) or out of band, such as will be further described below. As a result, the SD-WAN device/computing element can then perform security policy enforcement, network routing, and/or other actions using the meta data information associated with a given flow without having to perform the inspection (e.g., Deep Packet Inspection (DPI)) to independently determine such meta data information (e.g., App ID, User ID, Device ID, Content ID, and/or other meta data associated with a flow), which is more efficient and reduces usage of CPU and memory resources at the SD-WAN device/computing element.

In an example enterprise network in which the SD-WAN function is provided by an SD-WAN customer-premises equipment (CPE) element/device, and a security function is provided in the cloud by a cloud-based security service, then the metadata determined/extracted on the flows passing through the SD-WAN CPE and cloud-based security service can be exchanged between the SD-WAN CPE and cloud-based security service to enrich the functionality and/or avoid performance compute expensive functions, such as inspection/DPI for determining App ID, User ID, Device ID, Content ID, and/or other meta data associated with a flow performed more than once/at each of the SD-WAN CPE and cloud-based security service.

In this example, if the SD-WAN CPE has performed the application identification (App ID), then the SD-WAN CPE can communicate the App ID to the cloud-based security service to avoid the cloud security function from having to perform the application identification again. Similarly, if the cloud security function has performed the Application Layer Gateway (ALG) function, it can communicate the predictive flows to the SD-WAN CPE.

As such, significant performance improvements are provided using the disclosed techniques for providing flow meta data exchanges between network and security functions for a security service, which can also facilitate reduced computing costs for performing the cloud security service and better scalability of the SD-WAN devices/elements (e.g., thereby also allowing for a lower cost branch SD-WAN device/element solution).

Accordingly, various techniques for providing flow meta data exchanges between network and security functions for a security service are disclosed as will be further described below.

In addition, the disclosed techniques also facilitate a unique and integrated security solution that provides for consistency in the meta data information associated with each flow (e.g., App ID, User ID, Device ID, Content ID, and/or other meta data associated with a flow) across these networking and security functions as will now be further described below.

Overview of Techniques for Providing Consistent Monitoring and Analytics for Security Insights for Network and Security Functions for a Security Service In an enterprise network in which traffic engineering allows for policies to permit certain types of traffic to be white listed and allowed to exit a branch or a mobile device (e.g., a split tunnel configuration, such as for certain types of traffic such as Netflix or YouTube to be whitelisted), security monitoring can be impaired as the white listed traffic will bypass the cloud security function. Enterprises often configure network/security policies to allow a subset of applications to exit, for example, the branch directly to the Internet, which can be performed using an SD-WAN traffic forwarding policy.

As a result, security context on the flows of such applications is absent in the network/security logging data (e.g., Cortex™ data lake as commercially available from Palo Alto Networks, Inc. headquartered in Santa Clara, Calif. or another commercially available network/security logging data solution can similarly be used to implement the disclosed techniques), as such flows will be routed to bypass the cloud-based security service and exit, for example, the branch directly to the Internet. This resulting lack of visibility on such flows can lead to a gap in the security posture of the enterprises. Similar problems can arise in the following scenarios: (1) the flows that pass between enterprise sites directly (over the SD-WAN fabric); and (2) a split tunnel configuration on a VPN client for an endpoint device, which allows flows to exit to the Internet from the endpoint device. In both scenarios, the flows bypass security monitoring at the security service, which gives rise to this technical problem of security context on the flows of such applications being absent in the network/security logging data as a result of such network/security policy configurations.

Accordingly, various techniques for providing consistent monitoring and analytics for security insights for network and security functions for a security service are disclosed.

In some embodiments, a system/process/computer program product for providing consistent monitoring and analytics for security insights for network and security functions for a security service includes receiving a flow at a software-defined wide area network (SD-WAN) device; inspecting the flow to determine whether the flow is associated with a split tunnel; and monitoring the flow at the SD-WAN device to collect security information associated with the flow for reporting to a security service.

In some embodiments, a system/process/computer program product for providing consistent monitoring and analytics for security insights for network and security functions for a security service includes receiving a flow at a software-defined wide area network (SD-WAN) device; inspecting the flow to determine whether the flow is associated with a split tunnel; and mirroring the flow from the SD-WAN device to a security service, wherein the security service monitors the flow mirrored from the SD-WAN device to collect security information associated with the flow for reporting.

For example, this blind spot can be remedied by having the branch SD-WAN and/or the VPN client on the endpoint device (e.g., a commercially available VPN client such as the GlobalProtect client available from Palo Alto Networks, Inc. headquartered in Santa Clara, Calif. or another commercially available VPN client solution can similarly be used to implement the disclosed techniques) collect and export security information on the flows (e.g., including security information that is equivalent to/consistent with the information that would be collected by the cloud security function itself). A similar technique can be applied to the site to site enterprise traffic that passes over the site to site tunnels, thereby bypassing the cloud security function.

For example, the disclosed techniques can include configuring the SD-WAN device/element to collect and send flow data with security context to the cloud-based security service (e.g., at the cloud-based security service, such as provided via Prisma Access, which is a commercially available cloud-based security service from Palo Alto Networks, Inc. headquartered in Santa Clara, Calif., or another commercially available cloud-based security service can similarly be used to implement the disclosed techniques, and the cloud-based security service can be provided using a private cloud, one or more public cloud service providers, and/or any combination thereof).

As another example, the disclosed techniques can include configuring the SD-WAN device/element to mirror traffic flows associated with selected applications (e.g., App IDs) to the cloud-based security service so that security context can be gathered on those flows (e.g., SD-WAN devices/elements can export flow data through IPfix/Netflow or using other secure communication mechanisms as further described below).

In these examples, data ingestion and processing layers associated with the cloud-based security service can merge the data from the SD-WAN device/element and the cloud-based security service to provide a consistent security context to facilitate consistent monitoring and analytics for security insights for network and security functions for a cloud-based security service solution.

Using these disclosed techniques for providing consistent monitoring and analytics for security insights for network and security functions for a security service, an enterprise customer does not need to deploy, manage, and monitor another device in the branch and a service on the endpoint devices (e.g., a mobile device, such as a laptop or a smart phone). For instance, the SD-WAN device or VPN client is in the data plane and performs the function of split tunneling. As such, the SD-WAN device or VPN client can determine which flows are being sent to the cloud, Internet, or another enterprise site, thereby bypassing the cloud security service, and therefore, the SD-WAN device or VPN client can be intelligently configured for collecting data (e.g., in varying levels of granularity) for the traffic routed over these example different paths to facilitate consistent monitoring and analytics for security insights for network and security functions for a cloud-based security service solution.

As such, the disclosed techniques also facilitate a unique and integrated security solution that provides consistent security context and monitoring regardless of how traffic flows in an enterprise network.

Accordingly, various techniques for providing consistent monitoring and analytics for security insights for network and security functions for a security service are disclosed as will also be further described below.

Figure 1B:
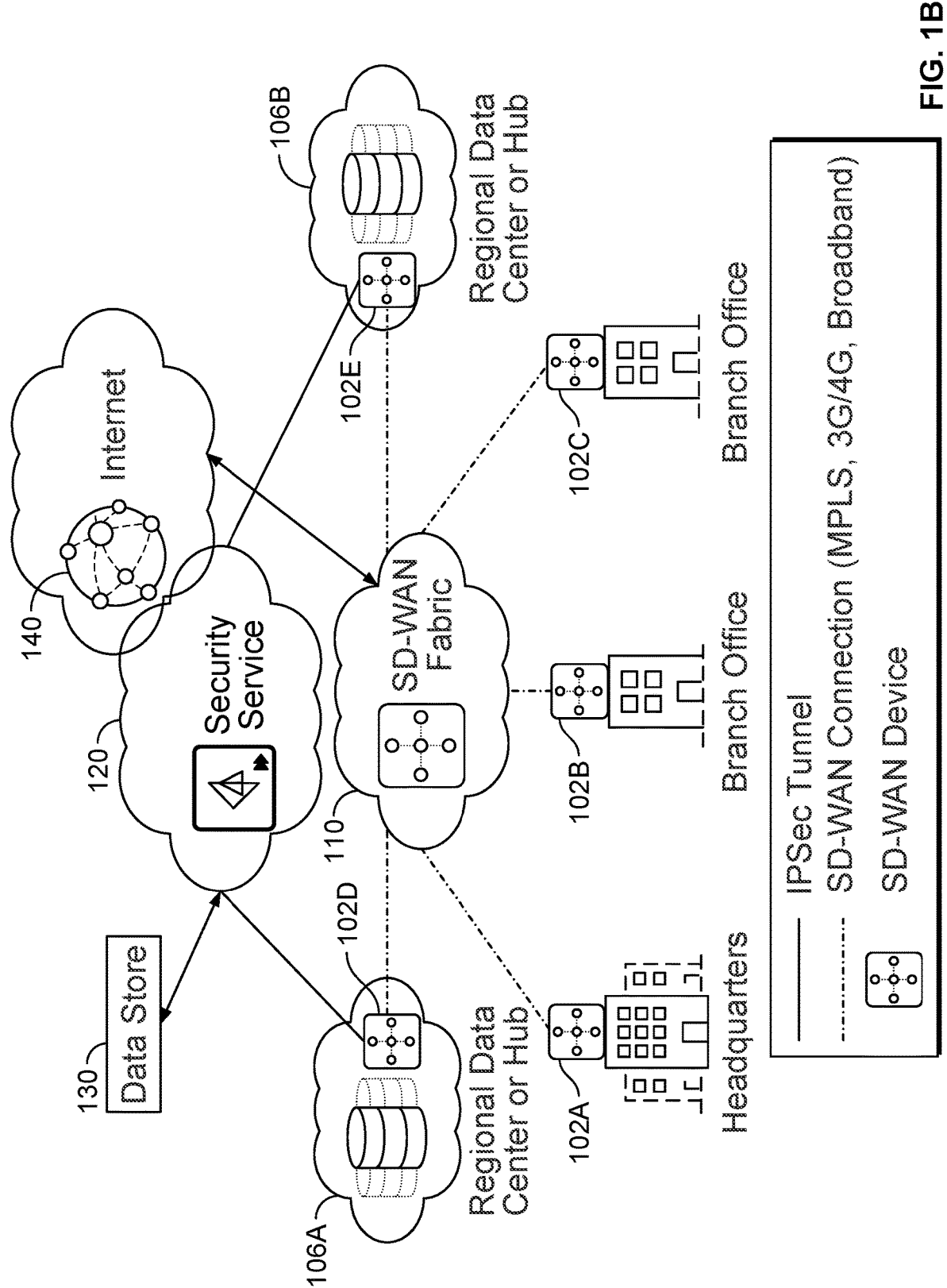

System Environments Including Example SD-WAN Architectures and a Security Service FIGS. 1A-1B are system environment diagrams including example SD-WAN architectures and a security service in accordance with some embodiments. These example system diagrams generally illustrate a security service for securing branch office and headquarter sites with SD-WAN connections in communication with a security service (e.g., a cloud-based security service).

As organizations grow across different geographical locations, choosing a network becomes a delicate balancing act of cost, performance, and security. A software-defined WAN (SD-WAN) simplifies the management and operation of a WAN by separating the networking hardware (the data plane) from its control mechanism (the control plane). SD-WAN technology allows companies to build higher-performance WANs using lower-cost Internet access. With the adoption of SD-WANs, organizations are increasingly connecting directly to the Internet, introducing security challenges to protect remote networks and mobile users. Additionally, the deployment of Software as a Service (SaaS) applications has significantly increased, with many organizations directly connecting to such cloud-based SaaS applications, introducing additional security challenges. The adoption of SD-WAN technology introduces many benefits in cost savings and enables organizations to be agile and optimized. However, it also makes branch offices and users targets of cyber attacks and other technical security challenges as similarly described above.

SD-WAN security generally is desired to be as flexible as the networking, but it is also technically challenging to adapt traditional security approaches to such evolving SD-WAN networking in various enterprise network environments such as shown in FIGS. 1A and 1B as will be described below. In a traditional campus network design, there is a full stack of network security appliances at the Internet perimeter that can protect the branch, which is true if all traffic is brought through the core network to pass through such a full stack of network security appliances at the Internet perimeter. However, SD-WANs do not always use this network architecture, such as if the SD-WANs are configured to integrate cloud/SaaS applications.

An alternative to the traditional approach is to deploy network security appliances at the branch office. However, this traditional approach complicates the deployment as it brings the security device/element closer to the branch office.

SD-WAN technology generally uses the principles of software-defined networking (SDN) and separates the control plane and the data plane. Based on this principle, SD-WAN deployments generally include the following components: (1) a controller that administrators use to centrally configure WAN topologies and define traffic path rules; and (2) SD-WAN edge devices, either physical or virtual, that reside at every site and act as the connection and termination points of the SD-WAN fabric.

In an example SD-WAN Type 1 deployment (e.g., branches and headquarters deployment), at each branch site, organizations can deploy one or more SD-WAN edge devices and connect them to form an SD-WAN fabric or SD-WAN overlay. Administrators use the SD-WAN controller, based either in the cloud or on the organization's premises, to manage and configure these edge devices and define the traffic forwarding policies at each site.

Referring to FIG. 1A for an example deployment (e.g., branches, headquarters, and regional data center deployment), the IPSec tunnels are setup between each of the SD-WAN edge devices 102A, 102B, and 102C at each data center (e.g., including IPSec tunnels between the SD-WAN edge device(s) at each branch and headquarters site) and a security service 120 (e.g., a cloud-based security service, such as provided via Prisma Access, which is a commercially available cloud-based security service from Palo Alto Networks, Inc. headquartered in Santa Clara, Calif.). This example system diagram is an example deployment for securing traffic from each branch site with one WAN link (Type 1) as shown at 110. SD-WAN Fabric 110 and security service 120 are each in communication with the Internet 140. Security service 120 is in communication with a data store 130 (e.g., a data store for network/security logging data, such as a Cortex™ data lake, which is commercially available from Palo Alto Networks, Inc. headquartered in Santa Clara, Calif.).

Specifically, this architecture adds SD-WAN devices in regional data centers, along with the SD-WAN devices at each branch and headquarters site. These regional data centers can be public or private cloud environments. SD-WAN devices at the regional data center aggregate network traffic for smaller sites in that region. For example, organizations can use this deployment when there are multiple regional branch sites with lower bandwidth connections to the Internet.

Referring to FIG. 1B, for another example deployment (e.g., branches, headquarters, and regional data center), the IPSec tunnels are setup between the SD-WAN edge device at each data center (e.g., including at SD-WAN devices 102D and 102E) and a security service 120 (e.g., a cloud-based security service, such as provided via Prisma Access, which is a commercially available cloud-based security service from Palo Alto Networks, Inc. headquartered in Santa Clara, Calif.). This example system diagram is an example deployment for securing SD-WAN deployments with Regional Hub/POP architectures. As shown, the IPSec tunnels are set up between each of the regional data centers or hubs 106A and 106B and the security service 120.

A common network architecture today is to tunnel traffic between an enterprise's headquarters and branches over either MPLS links or dedicated encrypted VPN links. As more and more services are cloud-based (e.g., including SaaS solutions, such as Microsoft Office 365®, Salesforce®, etc.), and more information is available on the Internet, it generally makes less sense to tunnel traffic back to an aggregation point before routing it to its final destination. Breaking out traffic locally from the branches (e.g., as opposed to an on-premises appliance) generally allows traffic to reach its destination faster and makes a more efficient use of bandwidth. However, allowing traffic directly between devices in the branch and the Internet also introduces new technical security challenges as similarly described above.

Specifically, in these and other example SD-WAN architectures and a security service, flows can be configured to pass through the security service 120 or to bypass the security service 120 and be routed to a regional data center or hub or the Internet without passing through the security service 120. As such, these and other example SD-WAN architectures and a security service give rise to the above-described technical security problems as traffic that passes through the security service is inefficiently inspected/monitored (e.g., DPI or other monitoring/inspection activities) at both the egress SD-WAN device/element as well as the security service. In addition, these and other example SD-WAN architectures and a security service give rise to the above-described technical security problems as traffic that bypasses the security service is not consistently inspected/monitored and analytics for security insights for network and security functions for the security service would not be collected.

As such, the disclosed techniques can be performed in these example SD-WAN architectures and a security service as will be further described below with respect to FIG. 2.

Figure 2:
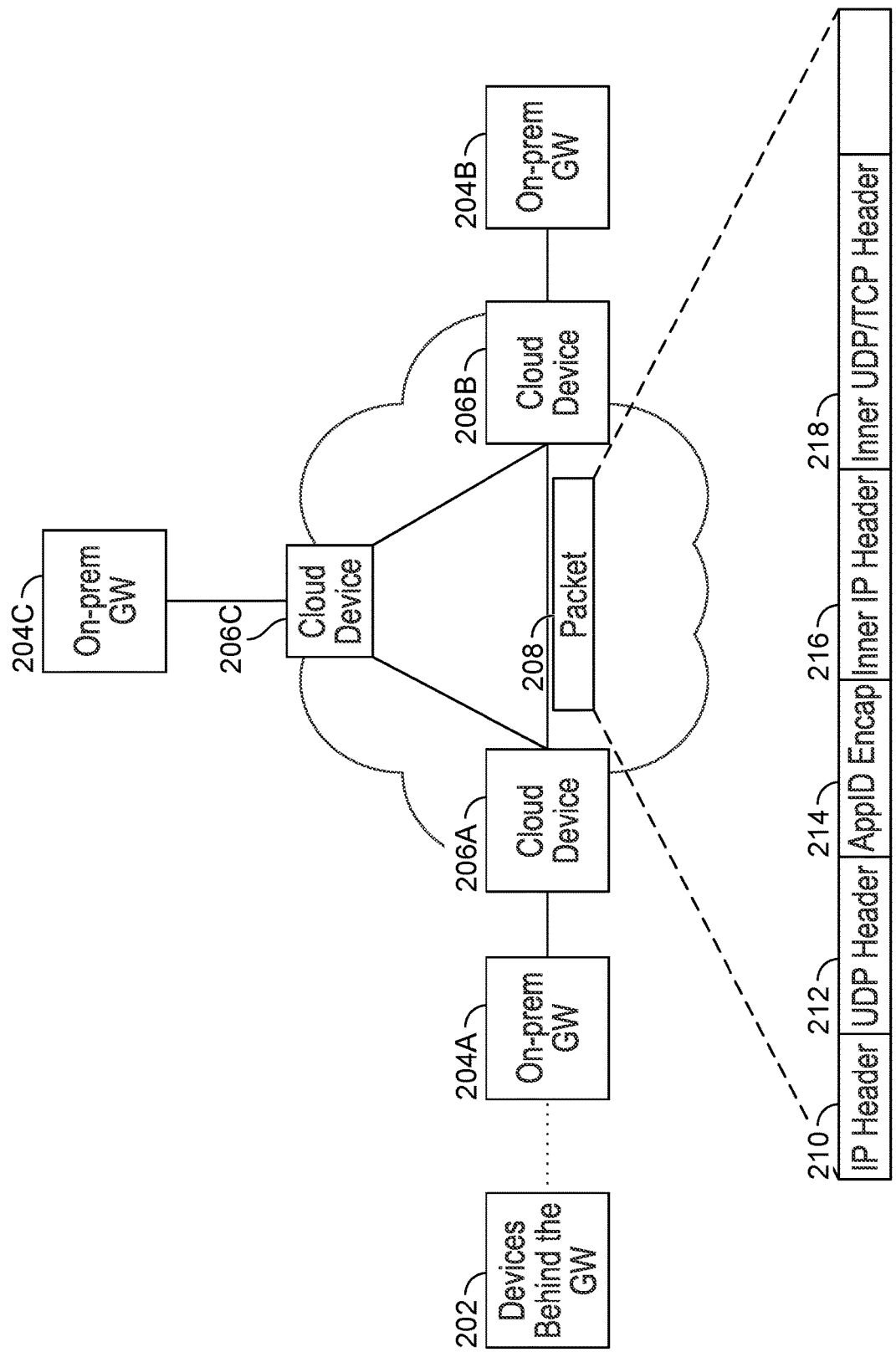
FIG. 2 is a system diagram that illustrates example components for providing flow meta data exchanges between network and security functions for a security service in accordance with some embodiments.

FIG. 2 is a system diagram that illustrates example components for providing flow meta data exchanges between network and security functions for a security service in accordance with some embodiments.

Referring to FIG. 2, devices behind/protected by a network gateway are shown at 202, on-premises network gateways are shown at 204A, 204B, and 204C (e.g., a security platform, such as a network gateway firewall solution that is commercially available from Palo Alto Networks, Inc., or another commercially available security platform solution can similarly be configured to implement the network gateway as disclosed herein), and cloud devices are shown at 206A, 206B, and 206C (e.g., an SD-WAN CPE device/element, such as an SD-WAN solution that is commercially available from Palo Alto Networks, Inc., or another commercially available SD-WAN solution can similarly be configured to implement the disclosed techniques).

Specifically, FIG. 2 illustrates an example mechanism for communicating flow meta data exchanges between network and security functions for a security service. As shown, packets are embedded with additional flow meta data information, such as APP ID information in this example. As shown, packet 208 includes an IP header 210, a UDP Header 212, an APP ID Encapsulation 214, an Inner IP Header 216, and an Inner UDP/TCP Header 218. Additional types of meta data information associated with a flow (e.g., User ID, Device ID, Content ID, and/or other meta data associated with a flow) can similarly be encapsulated and included in the packet header.

For example, processes for determining such meta data information associated with each flow (e.g., App ID, User ID, Device ID, Content ID, and/or other meta data associated with a flow) can be performed at one of the computing devices/elements/locations (e.g., at the cloud-based security service, such as security service 120 as shown in FIGS. 1A and 1B) using the disclosed techniques. The determined meta data information associated with each flow can then be communicated (e.g., securely and efficiently communicated) to an SD-WAN device (e.g., SD-WAN devices 102A, 102B, or 102C as shown in FIGS. 1A and 1B). In an example implementation, such determined meta data information associated with each flow is communicated in-band on the flows (e.g., using the encapsulated packet header information as described above, such as shown in FIG. 2) or out of band. As a result, the SD-WAN device/computing element can then perform security policy enforcement and/or other actions using the meta data information associated with a given flow without having to locally perform the inspection (e.g., Deep Packet Inspection (DPI)) to independently determine such meta data information (e.g., App ID, User ID, Device ID, Content ID, and/or other meta data associated with a flow), which is more efficient and reduces usage of CPU and memory resources at the SD-WAN device/computing element.

In an example enterprise network in which the SD-WAN function is provided by an SD-WAN customer-premises equipment (CPE) element/device, and a security function is provided in the cloud by a cloud-based security service, then the metadata determined/extracted on the flows passing through the SD-WAN CPE and cloud-based security service can be exchanged between the SD-WAN CPE and cloud-based security service to enrich the functionality and/or avoid performance compute expensive functions, such as inspection/DPI for determining App ID, User ID, Device ID, Content ID, and/or other meta data associated with a flow performed more than once/at each of the SD-WAN and cloud-based security service.

In this example, if the SD-WAN CPE has performed the application identification (App ID), then the SD-WAN CPE can communicate the App ID to the cloud-based security service to avoid the cloud security function from having to perform the application identification again. Similarly, if the cloud security function has performed the Application Layer Gateway (ALG) function, it can communicate the predictive flows to the SD-WAN CPE.

Various other packet headers (e.g., to encapsulate User ID, Device ID, Content ID, and/or other meta flow information) can be similarly implemented to facilitate communicating various other flow meta data exchanges between network and security functions for a security service to perform the disclosed techniques for providing flow meta data exchanges between network and security functions for a security service as will now be apparent to one of ordinary skill in the art in view of the various disclosed embodiments.

As such, significant performance improvements are provided using the disclosed techniques for providing flow meta data exchanges between network and security functions for a security service, which can facilitate reduced computing costs for performing the cloud security service and better scalability of the SD-WAN devices/elements (e.g., thereby allowing for a lower cost branch SD-WAN device/element solution).

In addition, the disclosed techniques also facilitate a unique and integrated security solution that provides for consistency in the meta data information associated with each flow (e.g., App ID, User ID, Device ID, Content ID, and/or other meta data associated with a flow) across these networking and security functions as will now be further described below.

Figure 3:
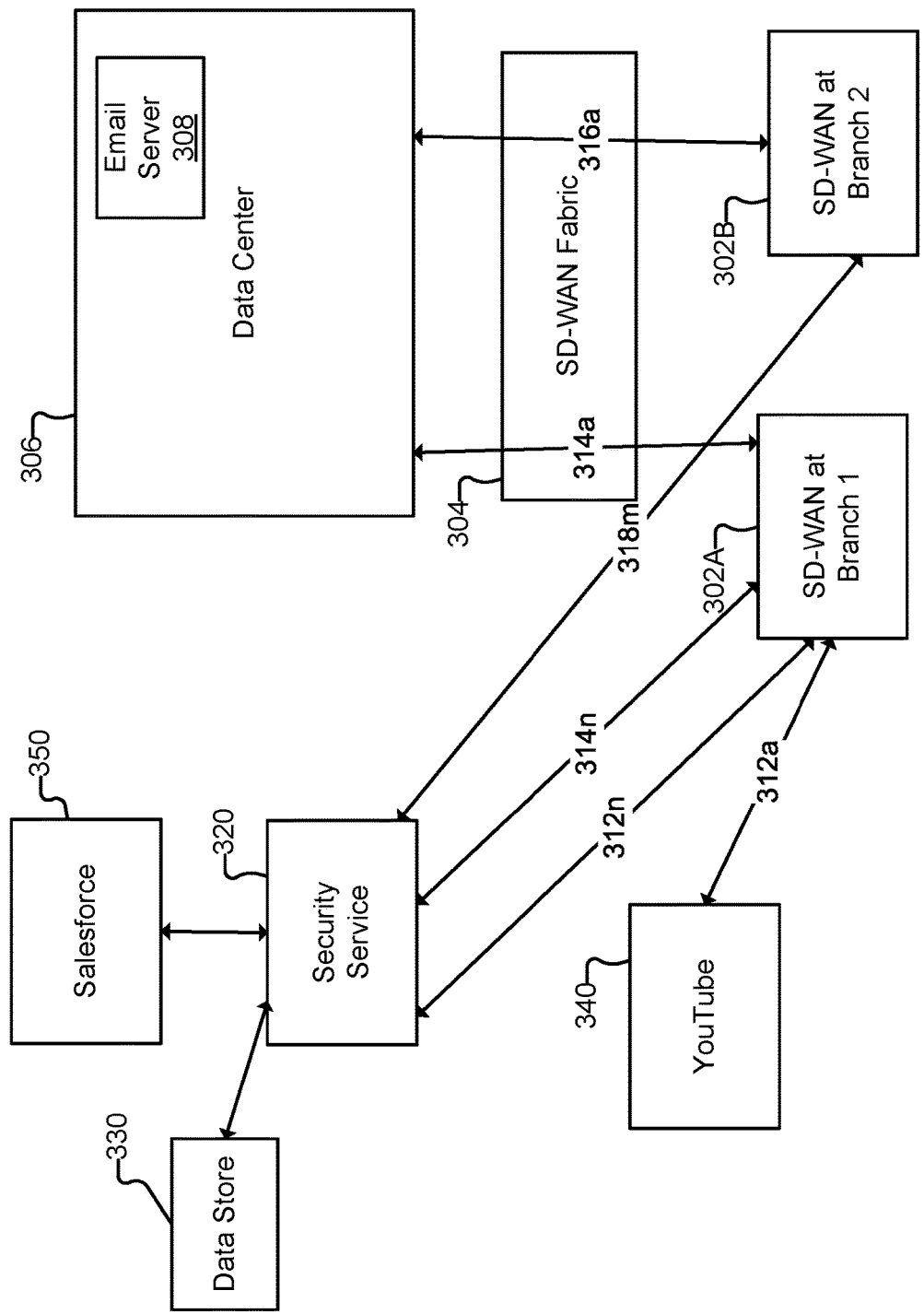
FIG. 3 is a system diagram that illustrates example components for providing consistent monitoring and analytics for security insights for network and security functions for a security service in accordance with some embodiments.

FIG. 3 is a system diagram that illustrates example components for providing consistent monitoring and analytics for security insights for network and security functions for a security service in accordance with some embodiments.

Referring to FIG. 3, network traffic for a YouTube service 340 is whitelisted and configured to be routed from branches/headquarters from SD-WAN devices/elements such as shown at 302A to the Internet and to bypass security service 320 as shown at 312a. In an enterprise network in which traffic engineering allows for policies to permit certain types of traffic to be white listed and allowed to exit a branch or an endpoint device (e.g., a split tunnel configuration, such as for certain types of traffic such as Netflix or YouTube to be whitelisted), security monitoring can be impaired as the white listed traffic will bypass the cloud security function. Enterprises typically allow a subset of applications to exit, for example, the branch directly to the Internet, which can be performed using an SD-WAN traffic forwarding policy.

As a result, security context on the flows of such applications is absent in the network/security logging data (e.g., Cortex™ data lake as commercially available from Palo Alto Networks, Inc. headquartered in Santa Clara, Calif.), as such flows will be routed to bypass the cloud-based security service and exit, for example, the branch directly to the Internet. This resulting lack of visibility on such flows can lead to a gap in the security posture of the enterprises. Similar problems can arise in the following scenarios: (1) the flows that flow between enterprise sites directly (over the SD-WAN fabric); and (2) a split tunnel configuration on a VPN client for an endpoint device, which allows flows to exit to the Internet directly from the endpoint device.

For example, this blind spot can be remedied by having the branch CPE SD-WAN such as shown at 302A (e.g., and/or the VPN client) collect and export security information (that is equivalent to the information collected by the cloud security function itself) on the flows and communicate such security information on the flows to security service 320 (e.g., such as shown at 312n for flows configured as split tunnel traffic that bypass the security service such as shown at 312a as similarly described above using a secure communication connection, such as an out of band communication mechanism or other periodic communication connection with the security service or other similar secure communication mechanisms can similarly be implemented to perform the disclosed techniques), which can then store the security information for logging in a data store 330 (e.g., a network/security logging data store, such as using the Cortex™ data lake as commercially available from Palo Alto Networks, Inc. headquartered in Santa Clara, Calif., which can be used for reporting and analysis for the security service for such enterprise network activities).

A similar technique can be applied to the site to site enterprise traffic that is communicated over the site to site tunnels, skipping the cloud security function, such as shown at 314a and 316a such as for traffic passing through an SD-WAN fabric 304 to a data center 306 that includes an email server 308 for the enterprise. For example, the disclosed techniques can include configuring the SD-WAN device/element to collect and send flow data with security context to the cloud-based security service, such as shown at 314n (e.g., using a secure communication connection, such as an out of band communication mechanism or other periodic communication connection with the security service or other similar secure communication mechanisms or other similar secure communication mechanisms can similarly be implemented to perform the disclosed techniques).

As another example, the disclosed techniques can include configuring the SD-WAN device/element to mirror traffic flows belonging to selected applications to the cloud-based security service such as shown at 318m so that security context can be similarly collected on those flows (e.g., establishing a secure communication connection to the security service similar to a new flow that would otherwise pass through the security service or other similar secure communication mechanisms can similarly be implemented to perform the disclosed techniques).

In contrast, certain flows, such as to Salesforce service 350, would be routed from the SD-WAN devices 302A and 302B through security service 320, and as such, no further action would be required to ensure such flows are consistently monitored and their flow data is logged in data store 330.

In these examples, data ingestion and processing layers associated with the cloud-based security service can merge the data from the SD-WAN device/element and the cloud-based security service to provide a consistent security context to facilitate consistent monitoring and analytics for security insights for network and security functions for a cloud-based security service solution.

Using these disclosed techniques for providing consistent monitoring and analytics for security insights for network and security functions for a security service, an enterprise customer does not need to deploy, manage, and monitor another device in the branch and a service on the endpoint devices (e.g., a mobile device, such as a laptop or a smart phone). For instance, the SD-WAN device or VPN client is in the data plane and performs the function of split tunneling. As such, the SD-WAN device or VPN client can determine which flows are being sent to the cloud, Internet, or another enterprise site, thereby bypassing the cloud security service, and therefore, the SD-WAN device or VPN client can be intelligently configured for collecting data (e.g., in varying levels of granularity) for the traffic routed over these example different paths to facilitate consistent monitoring and analytics for security insights for network and security functions for a cloud-based security service solution.

As such, the disclosed techniques also facilitate a unique and integrated security solution that provides consistent security context and monitoring regardless of how traffic flows in an enterprise network.

Figure 4A:
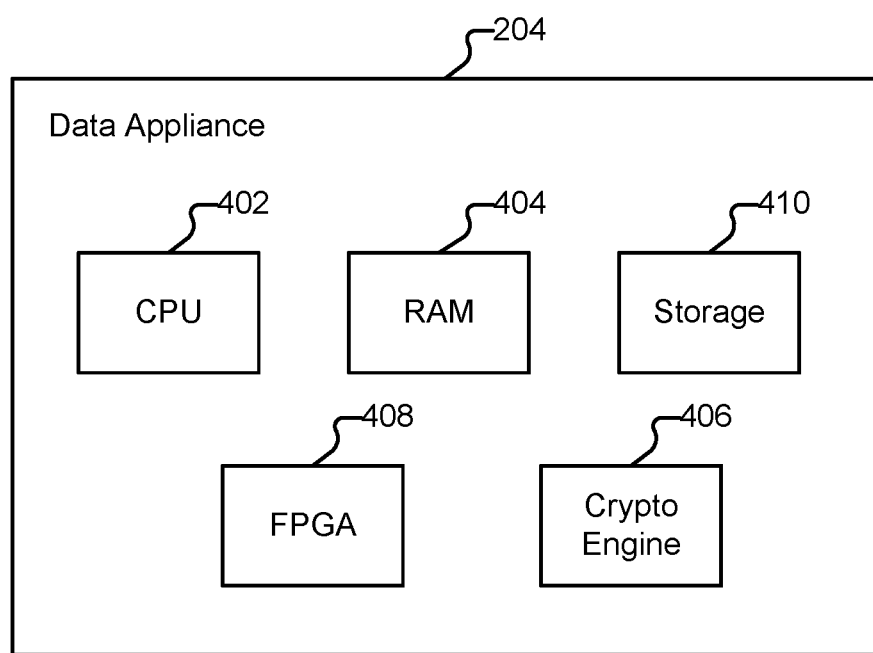
FIG. 4A illustrates an embodiment of a network gateway in accordance with some embodiments.

An embodiment of network gateway 204 is shown in FIG. 4A (e.g., such as network gateways shown at 204A-C in FIG. 2). The example shown is a representation of physical components that can be included in network gateway 204 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

The disclosed system processing architecture can be used with different types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 4B:
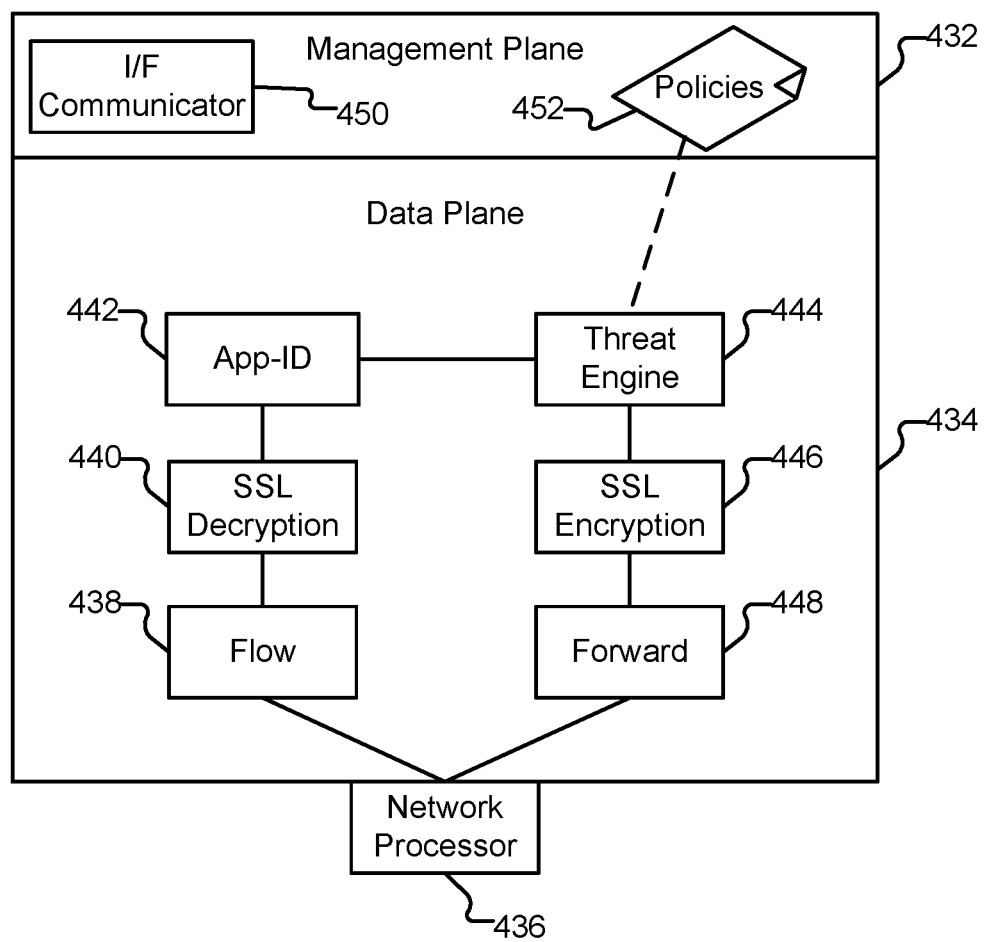
FIG. 4B is a functional diagram of logical components of an embodiment of a data appliance.

FIG. 4B is a functional diagram of logical components of an embodiment of a data appliance. The example shown is a representation of logical components that can be included in network gateway 204 in various embodiments (e.g., such as network gateways shown at 204A-C in FIG. 2). Unless otherwise specified, various logical components of network gateway 204 are generally implementable in a variety of ways, including as a set of one or more scripts (e.g., written in Java, python, etc., as applicable).

As shown, network gateway 204 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices, such as client device 204, and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 204 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., a web browsing session, the identified application can change, and such changes will be noted by network gateway 204. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4B, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Figure 5:
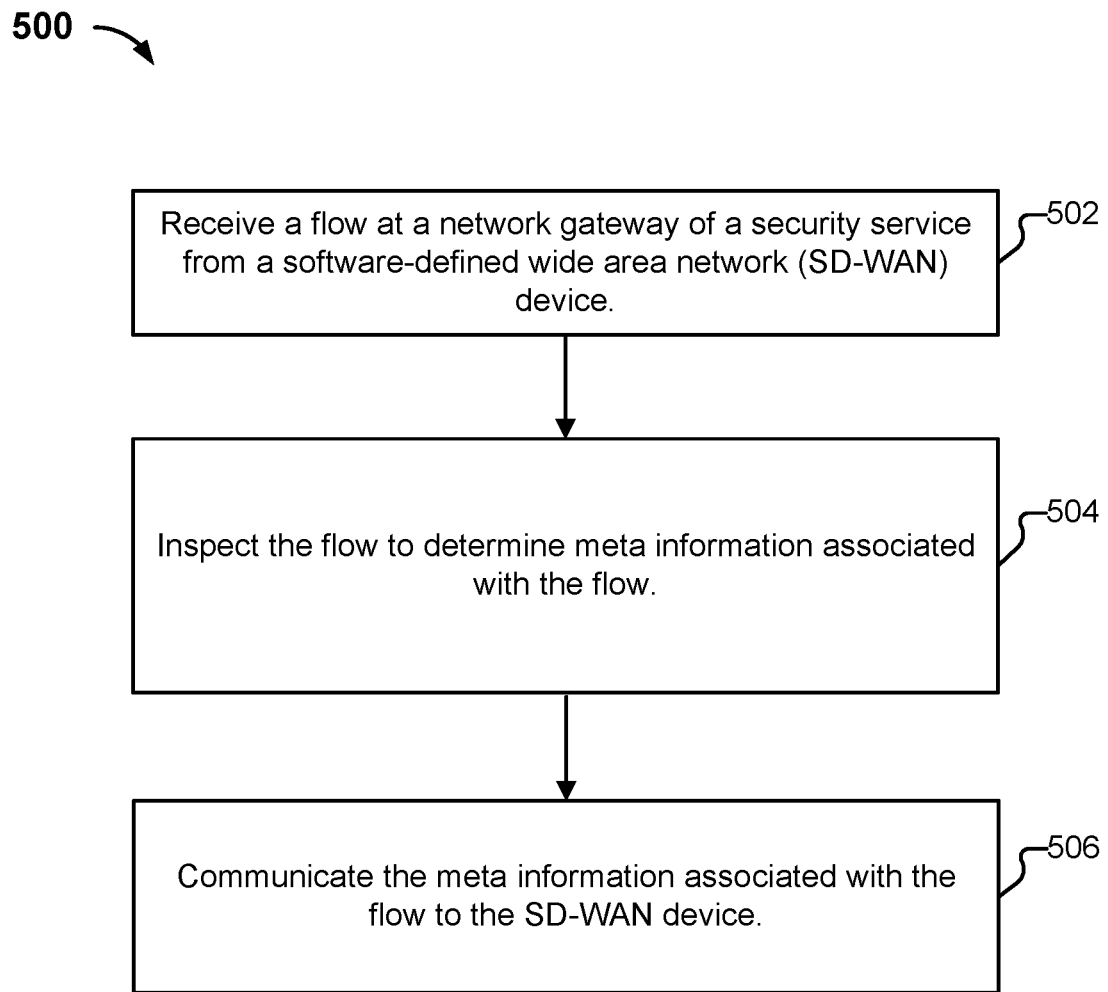
FIG. 5 is a flow diagram illustrating a process for providing flow meta data exchanges between network and security functions for a security service in accordance with some embodiments.

Example Processes for Providing Flow Meta Data Exchanges Between Network and Security Functions for a Security Service FIG. 5 is a flow diagram illustrating a process for providing flow meta data exchanges between network and security functions for a security service in accordance with some embodiments.

In one embodiment, process 500 is performed using the system architectures described above (e.g., such as described above with respect to FIGS. 1A-4B).

The process begins at 502 when a flow is received at a network gateway of a security service from a software-defined wide area network (SD-WAN) device. For example, the security service can be a cloud-based security service as similarly described above.

At 504, inspecting the flow to determine meta information associated with the flow is performed. For example, the flow can be determined to be a new flow at the network gateway of the security service, and an APP ID can be determined for the new flow using deep packet inspection (DPI) as similarly described above.

At 506, communicating the meta information associated with the flow to the SD-WAN device is performed. For example, the App ID information (e.g., or other inspected/extracted meta information associated with the flow, such as User ID, Device ID, Content ID, etc.) can be encapsulated and included in a packet header as similarly described above. The SD-WAN device can then enforce a routing policy or a security policy using the meta information associated with the flow as also similarly described above.

In some embodiments, the SD-WAN device communicates meta information associated with another flow to the security service.

Figure 6:
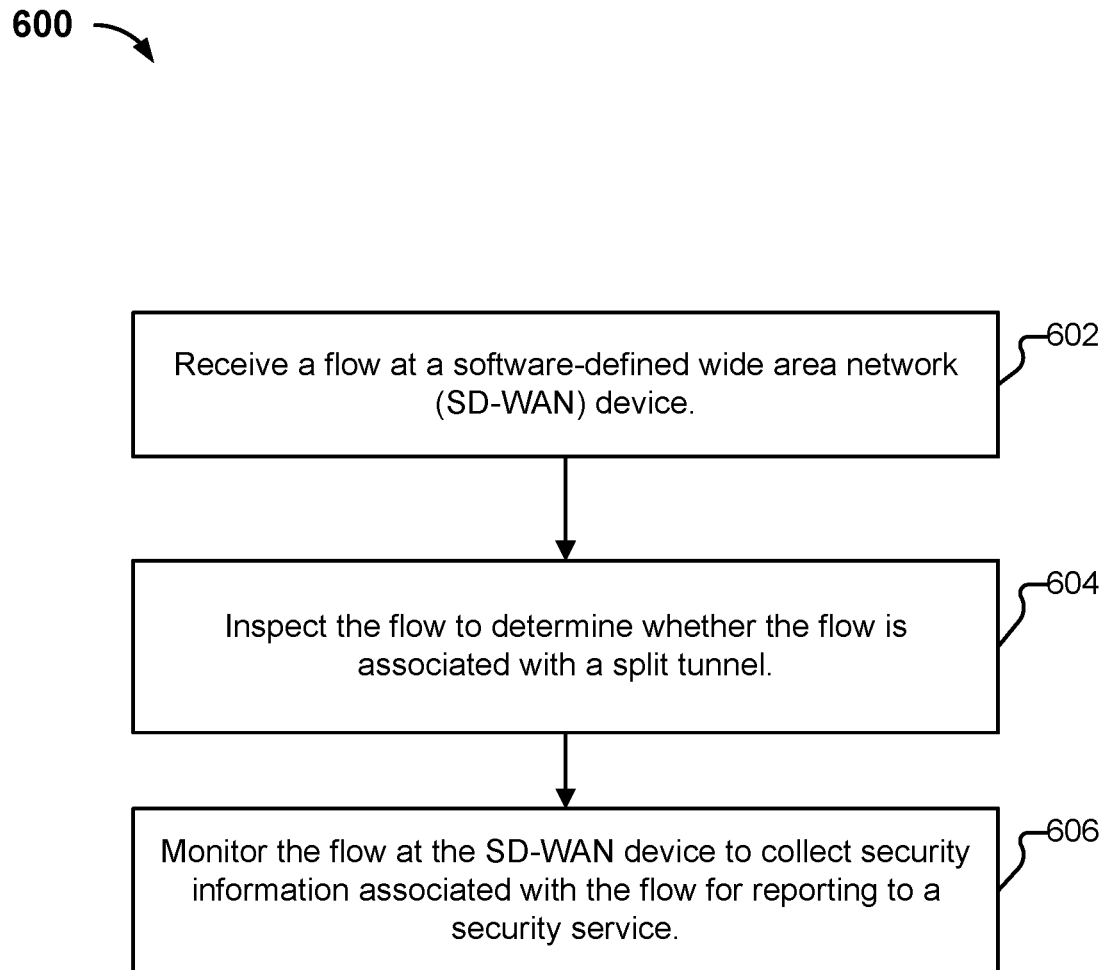
FIG. 6 is a flow diagram illustrating a process for providing consistent monitoring and analytics for security insights for network and security functions for a security service in accordance with some embodiments.

Example Processes for Providing Consistent Monitoring and Analytics for Security Insights for Network and Security Functions for a Security Service FIG. 6 is another flow diagram illustrating a process for providing consistent monitoring and analytics for security insights for network and security functions for a security service in accordance with some embodiments.

In one embodiment, process 600 is performed using the system architectures described above (e.g., such as described above with respect to FIGS. 1A-4B).

The process begins at 602 when a flow is received at a software-defined wide area network (SD-WAN) device.

At 604, inspecting the flow to determine whether the flow is associated with a split tunnel is performed. For example, the SD-WAN device can be configured to implement a split tunnel using a security policy (e.g., for white listed traffic/flows), and if the flow is associated with the split tunnel, then the flow can be allowed to bypass the security service based on a security policy as similarly described above.

At 606, the flow is monitored at the SD-WAN device to collect security information associated with the flow for reporting to a security service. For example, collected security information associated with the flow can include an ingress IP address, an egress IP address, an ingress port number, an egress port number, a protocol, and session data usage and time related statistics as similarly described above. The collected security information associated with the flow can be reported to the security service after a session associated with the flow is ended and/or such information can be periodically reported to the security service as also similarly described above.

In some embodiments, another flow is a site to site tunnel that bypasses the security service, and the SD-WAN device collects security information associated with the another flow for reporting to the security service as similarly described above.

Figure 7:
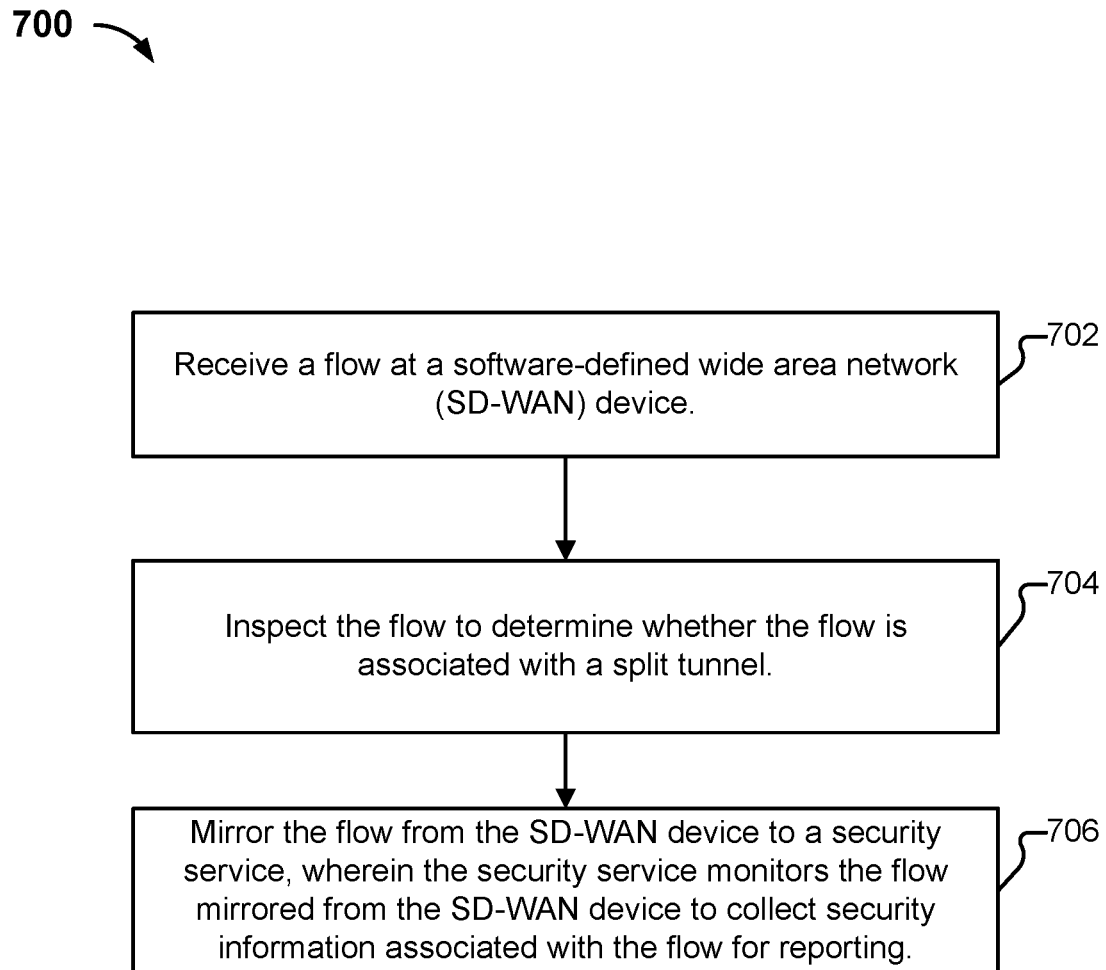
FIG. 7 is another flow diagram illustrating a process for providing consistent monitoring and analytics for security insights for network and security functions for a security service in accordance with some embodiments.

FIG. 7 is another flow diagram illustrating a process for providing consistent monitoring and analytics for security insights for network and security functions for a security service in accordance with some embodiments.

In one embodiment, process 700 is performed using the system architectures described above (e.g., such as described above with respect to FIGS. 1A-4B).

The process begins at 702 when a flow is received at a software-defined wide area network (SD-WAN) device.

At 704, inspecting the flow to determine whether the flow is associated with a split tunnel is performed. For example, the SD-WAN device can be configured to implement a split tunnel using a security policy (e.g., for white listed traffic/flows), and if the flow is associated with the split tunnel, then the flow can be allowed to bypass the security service based on a security policy as similarly described above.

At 706, the flow is mirrored from the SD-WAN device to a security service, in which the security service monitors the flow mirrored from the SD-WAN device to collect security information associated with the flow for reporting. For example, the security service can monitor the flow mirrored from the SD-WAN device to collect various security information associated with the flow, which can include an ingress IP address, an egress IP address, an ingress port number, an egress port number, a protocol, and session data usage and time related statistics as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
  receive a flow at a software-defined wide area network (SD-WAN) device;
  analyze the flow to determine whether the flow is associated with a split tunnel, comprising to:
    extract meta data information associated with one flow of the flow without performing deep packet inspection to independently determine the meta data information, wherein the meta data information includes one or more of the following: an application identifier (APP ID), User ID, Device ID, and/or Content ID;
    compare the extracted meta data information with meta data information associated with a whitelist policy; and
    in the event that the extracted meta data information matches the meta data information associated with the whitelist policy, determine that the one flow is associated with the split tunnel; and
  monitor the flow at the SD-WAN device to collect security information associated with the flow for reporting to a security service; and
a memory coupled to the processor and configured to provide the processor with instructions.

2. The system recited in claim 1, wherein the flow is associated with the whitelist policy and is allowed to bypass the security service based on a security policy.

3. The system recited in claim 1, wherein the flow is associated with the split tunnel and is allowed to bypass the security service based on a security policy.

4. The system recited in claim 1, wherein the processor is further configured to:
communicate the collected security information associated with the flow to the security service after a session associated with the flow is ended.

5. The system recited in claim 1, wherein the processor is further configured to:
periodically communicate the collected security information associated with the flow to the security service.

6. The system recited in claim 1, wherein the collected security information associated with the flow includes an ingress IP address, an egress IP address, an ingress port number, an egress port number, a protocol, and session data usage and time related statistics.

7. The system recited in claim 1, wherein the security service is a cloud-based security service.

8. The system recited in claim 1, wherein the security service is a cloud-based security service that is provided using a public cloud service provider.

9. The system recited in claim 1, wherein the security service is a cloud-based security service that is provided using a plurality of public cloud service providers.

10. The system recited in claim 1, wherein another flow is a site to site tunnel that bypasses the security service, and wherein the SD-WAN device collects security information associated with the another flow for reporting to the security service.

11. A method comprising:
receiving a flow at a software-defined wide area network (SD-WAN) device;

analyzing the flow to determine whether the flow is associated with a split tunnel, comprising:
  extracting meta data information associated with one flow of the flow without performing deep packet inspection to independently determine the meta data information, wherein the meta data information includes one or more of the following: an application identifier (APP ID), User ID, Device ID, and/or Content ID;
  comparing the extracted meta data information with meta data information associated with a whitelist policy; and
  in the event that the extracted meta data information matches the meta data information associated with the whitelist policy, determining that the one flow is associated with the split tunnel; and
monitoring the flow at the SD-WAN device to collect security information associated with the flow for reporting to a security service.

12. The method of claim 11, wherein the flow is associated with the whitelist policy and is allowed to bypass the security service based on a security policy.

13. The method of claim 11, wherein the flow is associated with the split tunnel and is allowed to bypass the security service based on a security policy.

14. The method of claim 11, further comprising:
communicating the collected security information associated with the flow to the security service after a session associated with the flow is ended.

15. The method of claim 11, further comprising:
periodically communicating the collected security information associated with the flow to the security service.

16. A computer program product, the computer program product being embodied in a tangible non-transitory computer readable storage medium and comprising computer instructions for:
  receiving a flow at a software-defined wide area network (SD-WAN) device;
  analyzing the flow to determine whether the flow is associated with a split tunnel, comprising:
    extracting meta data information associated with one flow of the flow without performing deep packet inspection to independently determine the meta data information, wherein the meta data information includes one or more of the following: an application identifier (APP ID), User ID, Device ID, and/or Content ID;
    comparing the extracted meta data information with meta data information associated with a whitelist policy; and
    in the event that the extracted meta data information matches the meta data information associated with the whitelist policy, determining that the one flow is associated with the split tunnel; and
  monitoring the flow at the SD-WAN device to collect security information associated with the flow for reporting to a security service.

17. The computer program product recited in claim 16, wherein the flow is associated with the whitelist policy and is allowed to bypass the security service based on a security policy.

18. The computer program product recited in claim 16, wherein the flow is associated with the split tunnel and is allowed to bypass the security service based on a security policy.

19. The computer program product recited in claim 16, further comprising computer instructions for:
  communicating the collected security information associated with the flow to the security service after a session associated with the flow is ended.

20. The computer program product recited in claim 16, further comprising computer instructions for:
  periodically communicating the collected security information associated with the flow to the security service.

21. A system comprising:
a processor configured to:
  receive a flow at a software-defined wide area network (SD-WAN) device;
  analyze the flow to determine whether the flow is associated with a split tunnel, comprising to:
    extract meta data information associated with one flow of the flow without performing deep packet inspection to independently determine the meta data information, wherein the meta data information includes one or more of the following: an application identifier (APP ID), User ID, Device ID, and/or Content ID;
    compare the extracted meta data information with meta data information associated with a whitelist policy; and
    in the event that the extracted meta data information matches the meta data information associated with the whitelist policy, determine that the one flow is associated with the split tunnel; and
  mirror the flow from the SD-WAN device to a security service, wherein the security service monitors the flow mirrored from the SD-WAN device to collect security information associated with the flow for reporting; and
a memory coupled to the processor and configured to provide the processor with instructions.

* * * * *